US006801545B2

(12) United States Patent
Stewart

(10) Patent No.: US 6,801,545 B2
(45) Date of Patent: Oct. 5, 2004

(54) CONTAINER TRANSPORT FOR PACKETS IN CONNECTION ORIENTED PROTOCOLS

(75) Inventor: Mark A. W. Stewart, Acton, MA (US)

(73) Assignee: Fujitsu Network Communications, Inc., Richardson, TX (US)

( * ) Notice: Subject to any disclaimer, the term of this patent is extended or adjusted under 35 U.S.C. 154(b) by 327 days.

(21) Appl. No.: 10/067,528

(22) Filed: Feb. 4, 2002

(65) Prior Publication Data

US 2003/0147393 A1 Aug. 7, 2003

(51) Int. Cl.[7] .................................................. H04J 3/24
(52) U.S. Cl. ....................... 370/473; 370/474; 370/475; 370/476; 370/477; 370/392; 370/395.52
(58) Field of Search .............................. 370/474, 475, 370/476, 473, 395.5–395.65, 395.7, 477, 392, 471

(56) References Cited

U.S. PATENT DOCUMENTS

| | | | |
|---|---|---|---|
| 5,809,021 A | 9/1998 | Diaz et al. | 370/364 |
| 6,295,296 B1 | 9/2001 | Tappan | 370/392 |
| 6,374,303 B1 | 4/2002 | Armitage et al. | 709/242 |
| 6,408,001 B1 * | 6/2002 | Chuah et al. | 370/392 |
| 6,438,137 B1 * | 8/2002 | Turner et al. | 370/466 |
| 6,473,421 B1 | 10/2002 | Tappan | 370/351 |
| 6,477,166 B1 | 11/2002 | Sanzi et al. | 370/395.1 |
| 6,512,744 B1 * | 1/2003 | Hughes et al. | 370/232 |
| 6,529,958 B1 | 3/2003 | Oba et al. | 709/237 |
| 6,721,334 B1 * | 4/2004 | Ketcham | 370/473 |
| 2002/0136230 A1 * | 9/2002 | Dell et al. | 370/416 |

FOREIGN PATENT DOCUMENTS

| | | |
|---|---|---|
| EP | 1009132 | * 12/1999 |
| EP | 1 009 132 A2 | 6/2000 |

OTHER PUBLICATIONS

*CVS log*, openmash.org, headers.txt, pp. 1–4, Undated.
*Short Packets, Definition and implementation of short packets*, May 24, 1993, pp. 1–5.
*Sample Comments and Responses*, Comments, CS 851, Spring 2000, pp. 1–14.
*RSVP Working Group Interim Meeting*, Cisco Systems, San Jose, CA, Apr. 29, 1999, pp. 1–8.

(List continued on next page.)

Primary Examiner—Wellington Chin
Assistant Examiner—Chuong Ho
(74) Attorney, Agent, or Firm—Weingarten, Schurgin, Gagenbin & Lebovici LLP

(57) ABSTRACT

A method and system for forwarding packets within containers in a data communication network. Each container may include packets or additional containers. Packets/containers are stored within containers in a predetermined format that includes a Type field, a Length field and a Value field. The Type field includes an indication whether the respective packet/container is the last packet/container in the respective sequence. The Length field specifies the Length of the following Value field and the Value field comprises the payload, which may comprise additional packets or containers. A header, such as an MPLS shim header, is applied to containers to be transmitted over the network. Containers are closed and scheduled for transmission once when it is determined that the addition of a packet/container to the overall container would exceed a predetermined maximum container size or when a timer measures a predetermined time period from the arrival of the first packet within the container.

13 Claims, 7 Drawing Sheets

| Field | First Container | | | |
|---|---|---|---|---|
| | Header₁ | Type_A | Length_A | Value_A |
| Length | 1 | .5 | .5 | 1 |
| Content | Header 1 | XXX | 1 | Header_A \| Payload_A |

| Field | First | | |
|---|---|---|---|
| | Type_B | Length_B | Value_B |
| Length | .5 | .5 | 1 |
| Content | XXX+EOC | 1 | Header_B \| Payload_B |

| Field | Second Container | | | |
|---|---|---|---|---|
| | Header₂ | Type_C | Length_C | Value_C |
| Length | 1 | .5 | .5 | 1 |
| Content | Header 2 | XXX | 1 | Header_C \| Payload_C |

| Field | Second Container | | |
|---|---|---|---|
| | Type_D | Length_D | Value_D |
| Length | .5 | .5 | 1 |
| Content | XXX+EOC | 1 | Header_D \| Payload_D |

OTHER PUBLICATIONS

*Common Protocols, An Engineering Approach to Computer Networking*, pp. 1–43, Undated.

*Multidiscipline Switching for Delivering Multimedia Services*, K.P.T. Raatikainen, VTT Information Technolgy, Telecommunications, pp. 1–5, Undated.

*IETF Jul. 1999 Proceedings, 2.7.14 Resource Reservations Setup Protocol (rsvp)*, Jun. 9, 1999, pp. 1–8.

*Payload Format Issues for Redundant Encodings in RTF*, draft–perkings–rtp–redundancy–01.txt, Jean–Chrysostome Bolot, et al., Jul. 19, 1996, pp. 3–16.

*Integration Strategies for IP Over WDM*, Nasir Ghani, Nokia Research Center, Boston, Optical Networks Workshop, Dallas, TX, Jan. 2000, pp. 1–22.

*Multi–Protocol Label Switching (MPLS)*, ATM Tech Papers, Protocols.com, Undated, pp. 1–2.

*MPLS Tutorial*, Nortel Networks, Peter Ashwood–Smith and Bilel N. Jamoussi, © 1999 (?), pp. 1–30.

*RTP Payload for Redundant Audio Data*, Armware RFC Archive, RFC 2198, Network Working Group, Sep. 1997, pp. 1–9.

*ATM overhead vs. Frame Relay overhead*, Christoph F. Strnadl, Sep. 5, 1997, pp. 1–2.

*Miscellaneous Slides*, pp. 1–5, Undated.

* cited by examiner

| Packet | A | |
|---|---|---|
| Field | Header | Value |
| Length | 1 | 1 |
| Content | Header A | Payload A |

| Packet | B | |
|---|---|---|
| Field | Header | Value |
| Length | 1 | 1 |
| Content | Header B | Payload B |

| Packet | C | |
|---|---|---|
| Field | Header | Value |
| Length | 1 | 1 |
| Content | Header C | Payload C |

| Packet | D | |
|---|---|---|
| Field | Header | Value |
| Length | 1 | 1 |
| Content | Header D | Payload D |

*Fig. 3a*

First Container

| Field | Header₁ | Type_A | Length_A | Value_A | |
|---|---|---|---|---|---|
| Length | 1 | .5 | .5 | 1 | |
| Content | Header 1 | XXX | | | Header_A | Payload_A |

First

| Field | Type_B | Length_B | Value_B | |
|---|---|---|---|---|
| Length | .5 | .5 | 1 | |
| Content | XXX+EOC | | | Header_B | Payload_B |

Second Container

| Field | Header₂ | Type_C | Length_C | Value_C | |
|---|---|---|---|---|---|
| Length | 1 | .5 | .5 | 1 | |
| Content | Header 2 | XXX | | | Header_C | Payload_C |

Second Container

| Field | Type_D | Length_D | Value_D | |
|---|---|---|---|---|
| Length | .5 | .5 | 1 | |
| Content | XXX+EOC | | | Header_D | Payload_D |

*Fig. 3b*

Third Container

First Container

| Field | Header₃ | Type₁ | Length₁ | Header₁ | Type_A | Length_A | Value_A |
|---|---|---|---|---|---|---|---|
| Length | 1 | .5 | .5 | 1 | .5 | .5 | 1 |
| Content | Header₃ | XXX | 5 | Header₁ | XXX | 1 | Header_A |

| Field | Type_B | Length_B | Value_B | | | | Payload_A |
|---|---|---|---|---|---|---|---|
| Length | .5 | .5 | 1 | | | | |
| Content | XXX+EOC | 1 | Header_B | | | | |

Third Container / Second Container

| Field | | Type₂ | Length₂ | Header₂ | Type_C | Length_C | Value_C |
|---|---|---|---|---|---|---|---|
| Length | | .5 | .5 | 1 | .5 | .5 | 1 |
| Content | | XXX+EOC | 5 | Header₂ | XXX | 1 | Header_C |

Third Container / Second Container (cont.)

| Field | Value_C | Type_D | Length_D | Value_D | Header_D | Payload_D |
|---|---|---|---|---|---|---|
| Length | 1 | .5 | .5 | 1 | | |
| Content | | XXX+EOC | 1 | Header_D | | |

*Fig. 3c*

CONTAINER TRANSPORT FOR PACKETS IN CONNECTION ORIENTED PROTOCOLS

CROSS REFERENCE TO RELATED APPLICATIONS n/a

STATEMENT REGARDING FEDERALLY SPONSORED RESEARCH OR DEVELOPMENT n/a

BACKGROUND OF THE INVENTION

The present invention relates to data communication networks and more specifically to a method and apparatus for transporting a plurality of smaller packets within a container to reduce the number of switching operations that need to be performed within the forwarding engine of a network switch.

In recent years the use of packet switched networks for the communication of data, voice and video has become relatively common. Such networks typically include a plurality of network switching devices that are selectively interconnected by communication links. Each network switching device has a plurality of input ports for receiving information from corresponding communication links and a plurality of output ports for forwarding information from the respective network switching devices. Information is conveyed in packets from a source end station such as a workstation, a storage device, or any other data source to a destination end station through selected network switching devices. Information contained within a header field of the packet is employed upon receipt at an input port of the respective network device at which the packet is received to identify the proper output port for packet forwarding from that network device.

While some packet switched data, such as email, is insensitive to jitter and delay variations in the transmission path from the source to the destination, the transmission of voice and video in real time requires that jitter and delay within the network be held within certain limits. To deal with such limitations, network protocols such as the Asynchronous Transfer Mode (ATM) protocol were developed to provide different Quality of Service (QoS) levels to be applied to different data flows based upon the bandwidth, jitter and delay requirements for the respective connections. In the ATM environment, a 53-byte packet employing a 5-byte header was adopted. By specifying a short packet length, QoS requirements could be administered within the network devices.

However, the necessity to determine the output port for large numbers of small packets has placed a substantial burden on the network switching devices, and more particularly, on the forwarding engines or crossbar switches, within such devices as the increase in transmission speeds across the communication links has outpaced the increases in clock speeds within the network switching devices.

It would therefore be desirable to provide a technique that reduces the burden on the forwarding engine of a network switching device within a communication network by reducing the number of switching operations that need to be performed.

BRIEF SUMMARY OF THE INVENTION

In accordance with the present invention, a method and system are disclosed for transmitting a plurality of packets over a data communications network as a single larger packet that includes a header portion and at least one container portion. In one embodiment, the single larger packet includes a Multi-Protocol Label Switching (MPLS) shim header. The container includes a sequence of triplets of form Type (T), Length (L) and Value (V). The TLV triplets may be of variable length as the length of the Value (V) within each triplet may vary. The Type field is a fixed length field and includes a bit that indicates if the particular packet is the last packet or container within the larger container. The Length field is a fixed length field that indicates the Length of the Value field that immediately follows the Length field. The Value field represents the payload associated with a TLV triplet. The Value field may contain a header and other TLV triplets and may contain additional containers or packets.

The packing of a container is performed in a series of stages as packets arrive at a network switching device. During these stages, the container is assembled as packets arrive at a network switching device that constitutes an aggregator node. The aggregator assembles within a larger packet packets or containers that have the same QoS criteria and are destined for the same location (at least along a predetermined network path).

Timers are maintained at each aggregator node for each packet being assembled. The timers measure the time from the arrival of the first packet in the respective container. In the event the timer exceeds a predetermined timer threshold, the respective container is closed and the container is scheduled for transmission. The timer thereby serves to prevent the system from introducing excessive jitter.

A size threshold is established for each container being assembled. The size threshold defines the maximum allowable size for the respective container. In the event the addition of the next packet or container to the larger container would cause the overall container to exceed the size threshold, the container is closed and scheduled for transmission. Finally a minimum desired fill level threshold may be maintained.

Each network switching device within the transmission path that receives a container that is to be forwarded need only inspect the header to determine the output port to be used for forwarding of the container and all of the associated containers and packets making up the received container. Consequently the forwarding engine need only perform a single determination of the output port to be employed rather than the number of operations that would be necessary if a forwarding decision needed to be made for each packet within the container.

Containers are unpacked at appropriate devices along the communications path so that the packets may be properly routed to the ultimate destination.

As evident from the above description, the container may represent a hierarchical structure in which packets within a container may also include containers that hold other packets or containers. Any number of tiers of containers may thus be supported.

Other features, aspects and advantages of the presently described method and system for transmitting messages within a container will be apparent to those of ordinary skill in the art from the Detailed Description of the Invention that follows.

BRIEF DESCRIPTION OF THE SEVERAL VIEWS OF THE DRAWING

The invention will be more fully understood by reference to the following Detailed Description of the Invention in conjunction with the accompanying Drawing of which:

FIG. 3a is a diagram depicting a typical data format for four packets received at network switching devices within the illustrative network depicted in FIG. 1;

FIG. 3b is a diagram illustrating the packing of the packets depicted in FIG. 3a into first and second containers using the presently disclosed TLV packing format;

FIG. 3c is a diagram illustrating the packing of the first and second containers depicted in FIG. 3b into a single larger container using the presently disclosed TLV packing format;

DETAILED DESCRIPTION OF THE INVENTION

In accordance with the present invention, a method and system for communicating packets through a communications network in one or more containers is disclosed. More specifically, a large packet or container is employed to house a plurality of smaller packets or containers. A header is applied to the container and the container is transmitted over the network using, for example, a traffic transport protocol such as the known Multi-Protocol Label Switching (MPLS) protocol. Switching of each received container at a network switching device is performed based upon a label included within the MPLS header. Thus, the container may be forwarded along the appropriate label switched path via a single forwarding operation and over networks and through network devices employing disparate transport protocols.

Figure 1:
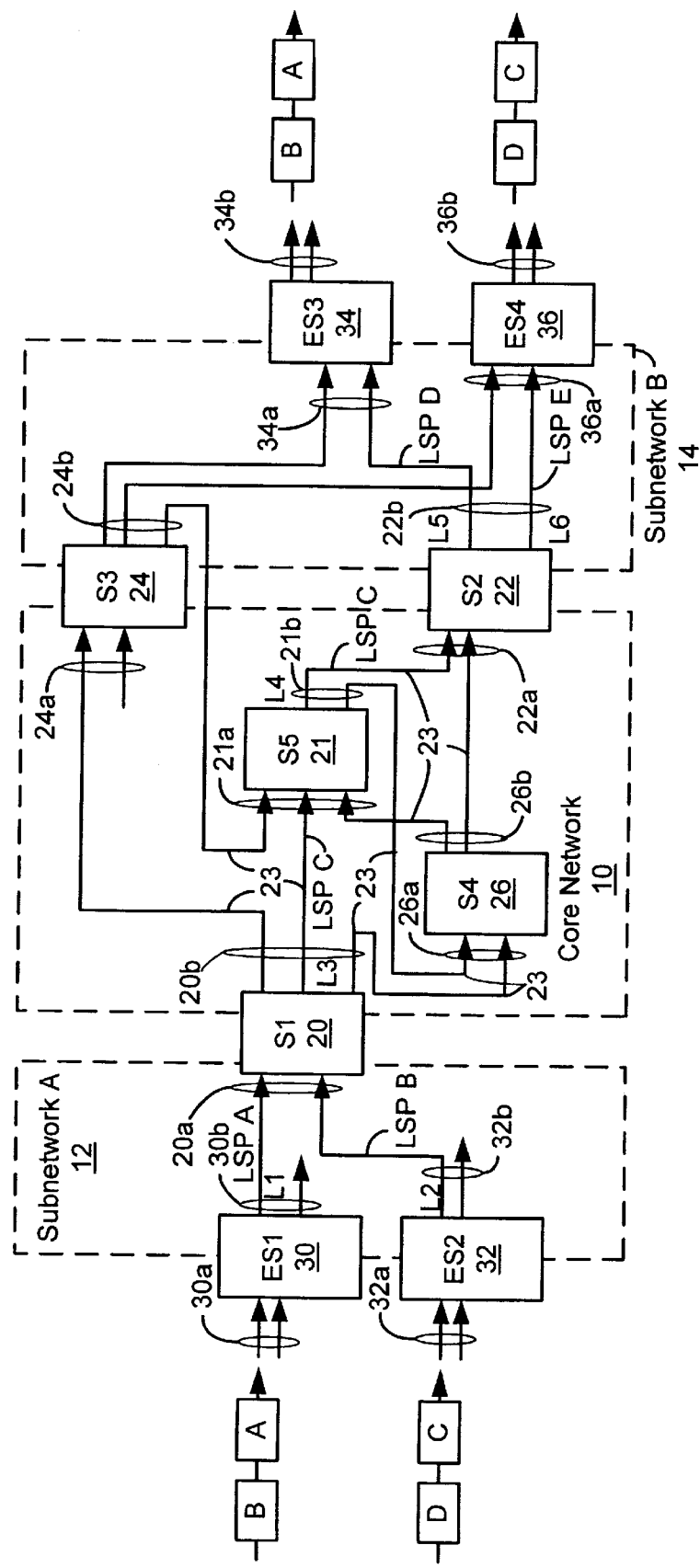
FIG. 1 is a block diagram depicting a network including network switching devices operative in accordance with the present invention.

FIG. 1 depicts an illustrative embodiment of a system operative in accordance with the present invention. More specifically, a core network 10 is communicably coupled to a first subnetwork A 12, such as a metropolitan area network (MAN) via a first network switching device S1 20. The core network 10 is also communicably coupled to a second subnetwork B 14, such as a metropolitan area network (MAN), via a second network switching device S2 22. The core network 10 includes a plurality of other network switching devices, such as network switching devices S3 24, S4 26 and S5 21 interconnected by links 23 to form a mesh. The switches S1 20, S2 22, S3 24, S4 26 and S5 21 each have a plurality of inputs and outputs 20a and 20b, 22a and 22b, 24a and 24b, 26a and 26b and 21a and 21b respectively for receiving and transmitting information over applicable communication links 23.

The plurality of network switching devices and interconnecting communication links 23 make up the core network 10 and permit a connection to be established between the network switching device S1 20 and the network switching device S2 22, for example, via network switching device S5 21. It should be noted that while the communication paths are depicted as uni-directional for simplicity of discussion and explanation of the presently disclosed system and method, in practice, communication paths are also established in opposing directions to facilitate bi-directional communication along the identified paths.

The illustrative subnetwork A 12 also includes a plurality of network switching devices including edge devices such as network switch ES1 30 and network switch ES2 32. Additionally, subnetwork A 12 may include a plurality of other network switching devices interconnected as a mesh network (not shown). The edge devices ES1 30 and ES2 32 include a plurality of inputs and outputs 30a and 30b and 32a and 32b respectively for receiving and transmitting information over associated communication links.

The subnetwork A 12 permits a communication path to be established between respective network devices within the subnetwork 12 and the network switch S1 20 to allow communication with the core network 10.

Additionally, the subnetwork B 14 includes a plurality of network switching devices including edge devices such as network switch ES3 34 and network switch ES4 36. The edge devices ES3 34 and ES4 36 each include a plurality of inputs and outputs 34a and 34b and 36a and 36b, respectively, for receiving and transmitting information over associated communication links. The subnetwork B 14 may include a plurality of other network switching devices interconnected as a mesh network (not shown). The subnetwork B 14 permits a communication path to be established between respective network devices within the subnetwork B 14 and, in the illustrative example, between the network switching device S2 22 and each of the illustrated edge switches ES3 34 and ES4 36.

It should be noted the the network depicted is merely intended to be illustrative of a network in which the presently disclosed system and method may be employed and it should be recognized that the presently described techniques may be employed in any suitable network.

In a preferred embodiment, the network switching devices and the edge switches are operative to perform packet transport in accordance with the Multi-Protocol Label Switching (MPLS) protocol known in the art and described in RFC 3031 and RFC 3032, both dated January 2001 and published by the Internet Society at www.ietf.org. The MPLS protocol employs a short fixed length label that is appended to a packet, such as an Internet Protocol (IP) packet. The label is employed for routing of packets through the network in MPLS capable routers. More specifically, in a typical application, IP packets are encapsulated with labels at the first MPLS capable device encountered as the packets enter the network. The packet is forwarded with the appended MPLS label and the label is employed at subsequent MPLS capable routers within the MPLS network for packet forwarding decision. The MPLS labels are removed from the packet as the packet exits the MPLS portion of the network. In the illustrative example, for simplicity of discussion, it is assumed that all routers within the Core Network 10, the subnetwork A 12 and the subnetwork B 14 comprise MPLS capable routers, although it should be recognized that such is not necessary for the implementation of the presently disclosed containerization technique.

The presently disclosed system performs containerized packet forwarding to reduce the number of switching operations that need to be performed by the network switching devices, such as devices S1 20, S5 21 and S2 22 and other network switching devices along the communication path between the packet source and the packet destination.

More specifically, referring to FIG. 1, packets A and B enter network switch ES1 30 at an input 30a of ES1 30. It is assumed for purposes of illustration that packets A and B are both destined for end stations coupled to edge switch ES3 34. To reduce the number of switching operations to be performed by switches within the network including network switches, packets A and B are assembled into a container at edge switch ES1 30 and an MPLS header is applied to the container within ES1 30. The packets to be placed within a single container have the same class of service since the packets traverse the same label switched path within the container for at least a portion of the designated path from source to destination.

Figure 2:
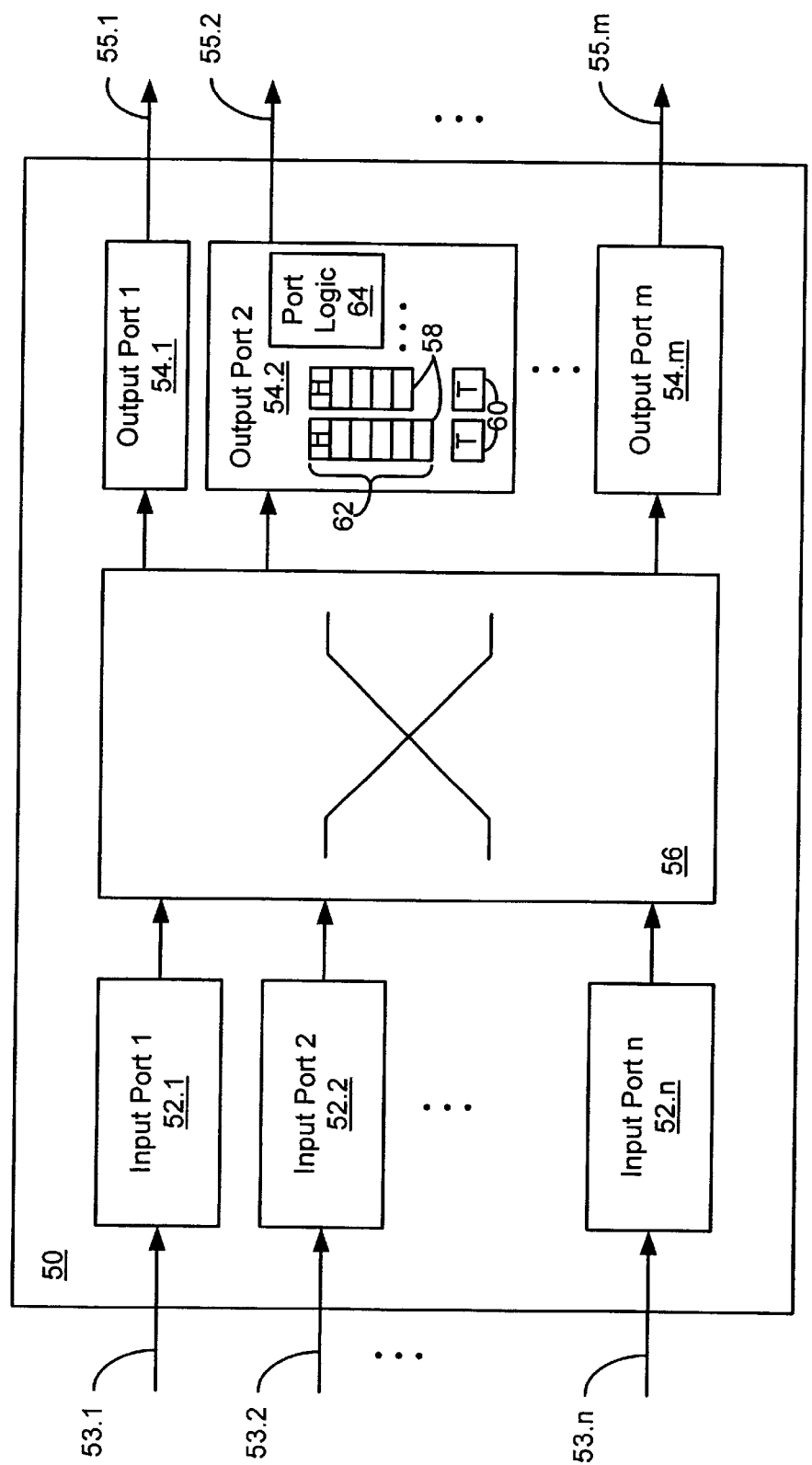
FIG. 2 is a block diagram depicting an exemplary network switching device of the type depicted in FIG. 1.

A exemplary network switching device 50 of the type depicted in FIG. 1 for the edge switches and core switches is depicted in the block diagram of FIG. 2. The network switching device 50 includes a plurality of input ports 1 through n 52.1–52.n for receiving packets over corresponding communication links 53.1–53.n respectively. The switch 50 further includes a plurality of output ports 1 through m 54.1–54.m that are communicably coupled to corresponding communication links 55.1–55.m. The outputs of the input ports 1 to n 52.1–52.n are coupled to the inputs of a forwarding engine 56 and outputs of the forwarding engine 56 are coupled to the inputs of the respective output ports 1–m 54.1–54.m. The forwarding engine 56 provides the capability to forward a packet received at any one of the input ports 52.1–52.n to one or more of the output ports 54.1–54.m. Based upon information contained within the header of a received packet, the respective input port logic employs forwarding tables associated with the respective input ports to determine which output port(s) will be employed for packet forwarding. The received packet is then forwarded to the proper output port(s) via the forwarding engine 56.

Containers may be assembled for each data flow exiting the respective output port of the network switch 50. For example, referring to FIG. 2 containers 58 are depicted that are associated with respective data flows. As packets are received that are destined for the same label switched path, an MPLS header H is generated and received packets are packed within appropriate containers upon receipt at the respective output port as subsequently described in greater detail. Each output port 54 includes port control logic 64 that is operative to perform all necessary control functions including queuing, scheduling and transmission of packets received at the respective output port 54.

A threshold is maintained for each container that specifies the maximum container size. Each container 58 is scheduled for transmission when it approaches the predetermined maximum container size 62. More specifically, upon receipt of a packet at the output port, if the addition of that packet to the respective container 58 would exceed the predetermined maximum container size 62, the packet is not added to the container. Instead, the container 58 is closed and scheduled for transmission. The received packet may then be inserted into a new container 58 and the process repeated. A single maximum container size 62 may be established for all containers 58 or alternatively, the maximum container size 62 may be established on a container by container basis.

A timer T 60 is associated with each container 58. The timer T 60 generally measures the time elapsed from the arrival of the first packet at the output port or from the queuing of the first packet within the associated container 58. In the event a predetermined time period elapses as measured by the timer T 60 before the container has reached the predetermined maximum container size 62, the container 58 is scheduled for transmission out of the respective output port. In this manner, the introduction of excessive delay and jitter may be avoided. While the structure of Output Port 2 54.2 is generally described above, it should be recognized that all output ports of aggregating routers are similar to the described output port to allow for containerization of packets as disclosed herein.

Optionally, a minimum fill size threshold may be maintained. In the event a container has been filled to a minimum fill size and a predetermined time has expired, the container may be closed and the packet scheduled for transmission. In this manner, the introduction of delay and jitter may be minimized where necessary.

The packing of containers in accordance with the presently disclosed technique is illustrated with respect to FIGS. 3a–3c. As depicted in FIG. 3a, the packet A includes a header portion Header A and a payload designated as Payload A. For purposes of illustration, both the length of the header of packet A and the length of the payload (or value) of packet A are considered to be of unit length although the length of the payload may be any suitable length in practice. Similarly, packet B includes a header portion Header B and a payload identified as Payload B, each of which is assumed for purposes of illustration to be of unit length.

Additionally, packets C and D are assumed to arrive at the network switch ES2 32 over link 32a. As depicted in FIG. 3a, packet C includes a header portion Header C and a payload identified as Payload C and packet D includes a header portion Header D and a payload portion identified as Payload D.

At each aggregating MPLS network device such as network devices ES1 30 and ES2 32, packets having the same class of service (FEC in MPLS) that are destined for transmittal over the same Label Switched Path (LSP) may be aggregated into a container according to a predetermined set of aggregation rules and using the presently disclosed packing format. More specifically, each aggregating network device forms a container that includes a header portion H, such as an MPLS shim header followed by a Type (T) field, a Length (L) field and a Value (V) field of arbitrary length that form a TLV sequence. Each packet to be forwarded within a container is packed within the container using the TLV format as described subsequently in greater detail, and is appended to the end of the set of packets within the container. The Type field of the TLV sequence comprises a one bit field that has either a first state or a second state. When the T field is in the first state (not End of Container (not EOC)), such indicates that the packet/container is not the last packet/container within the larger container. When the T field is in the second state (End of Container (EOC)), such indicates that the packet/container is the last packet/container within the respective container. For simplicity of discussion, the T field is assumed to be 0.5 units of length in the illustrated embodiment. The Length (L) field, in a preferred embodiment, comprises a 15 bit field that indicates the length of the following Value (V) field in bytes although in the illustrative embodiment it is also assumed that the Length field is 0.5 units in length for simplicity of discussion.

Received packets or other containers are stored within the Value field of a container. In a preferred implementation, the Type and Length fields are packed within a single contiguous 16 bit block at the head of the TLV sequence.

The packing algorithm involves a multistage process in which the container is grown from an empty container as packets arrive that have compatible Quality of Service requirements and that have the same forwarding path. More specifically, as packets arrive that are for the same forwarding equivalency class (FEC) and that are destined for transmission from an output port over the same communications link from the respective aggregating network switching device, the packets are successively stored within a container that includes an MPLS shim header. The MPLS shim header includes a label that is used by the next downstream network switching device for forwarding decisions.

The packing of containers in accordance with the presently disclosed technique is further illustrated by reference to FIGS. 1, 3a, 3b and 3c. Such figures illustrate the packing of received packets A and B into a first container at aggregating network switch ES1 30 and the packing of received packets C and D into a second container at aggregating network switch ES2 32 and the subsequent aggregation of the first and second containers into a third container prior to forwarding through the core network 10. More specifically, a container is opened for transmission of packets over Label Switched Path A (LSPA) from ES1 30 to S1 20 in subnetwork A 12. As illustrated in the upper portion of FIG. 3b, a shim header identified as Header 1 is generated that includes a label to be employed by the next hop network switching device. As depicted in FIG. 1 the shim header includes a label L1 to be employed by the downstream network device. Packets A and B received at network device ES1 30 over one of the inputs 30a are stored in the container by the aggregating network device ES1 in the above described TLV format. More specifically, as depicted in the upper portion of FIG. 3b, the first container being generated at ES1 30 includes a $Type_A$ field (XXX+Not EOC) that indicates that the respective TLV sequence does not constitute the last packet in the container. Additionally, the container includes a $Length_A$ field that specifies the length of the $Value_A$ field, which in the present example, comprises the length of packet A. Further, the header and payload of packet A comprising Header A and Payload A are stored within the container as shown. Additionally, packet B is stored within the first container as a TLV sequence. In the illustrated example, packet B is the last packet within the first container so the $Type_B$ field includes a bit (EOC) that is set to indicate that the respective TLV sequence is the last TLV sequence in the container. A length field $Length_B$ is stored in the container to specify the length of the following $Value_B$ field. Finally, packet B, comprising $Header_B$ and $Payload_B$, is stored within the container. Assuming the first container satisfies one of the above described criteria for transmission, the first container is closed and is scheduled for transmission over the Label Switched Path A (LSPA) (See FIG. 1) for receipt by network device S1 20.

Similarly, packets C and D are packed within a second container by aggregating network device ES2 32 and transmitted over a second label switched path LSP B for receipt by network device S1 20. The packing of packets C and D within the second container is depicted in the lower portion of FIG. 3b. For purposes of illustration, all headers are depicted as being of 1 unit length, Type fields and Length fields are depicted as being of 0.5 unit length and Value Fields are depicted as being of 1 unit length. A header identified as Header 2, and including a label L2, is applied to the second container and the second container is forwarded over Label Switched Path B for receipt by network device S1 20.

For purposes of illustration it is assumed that the packets contained within the first container and within the second container have the same quality of service requirements and are all destined for network switch S2 22 over LSP C (FIG. 1). In the illustrated example, the first container and the second container are received at network switch S1 20 over respective inputs 20a and aggregated using the above-described TLV format into a third container having a shim header including a label L3. The third container is transmitted over Label Switched Path C for receipt by network device S5 21. The data format employed in the assembly of the third container is depicted in FIG. 3c.

Referring to FIG. 3c, a header including a shim header, $Header_3$, is generated for the third container that will contain packets or containers to be transmitted over the label switched path LSP C to switch S5 21. The shim header includes the label L3 (FIG. 1) for use by the downstream network switching device S5 21 in making forwarding decisions. The first container is accumulated within the third container using the above-described TLV storage sequence. Solely for purposes of simplicity of discussion, all headers are assumed to be 1 unit in length, all Type and Length fields are assumed to be 0.5 units in length and all Value fields within packets are assumed to be 1 unit in length. In practice, it should be noted that the length of the value field within any given packet may vary and such is reflected in the content of the applicable Length field within the applicable TLV sequence.

Following $Header_3$, the third container includes a Type field ($Type_1$) that indicates whether the first container comprises the last container in the overall container. In the instant example, the $Type_1$ field does not include an End of Container (EOC) indication since the first container is not the last container within the third container. Following the $Type_1$ field, the third container includes the $Length_1$ field that defines the length of the following Value field. In the instant example, the content of the $Length_1$ field is "5" which equals the sum of the lengths of the fields within the first container (i.e. $Header_1$, $Type_A$, $Length_A$, $Value_A$, $Type_B$, $Length_B$ and $Value_B$). After the $Length_1$ field, the third container includes the first container as depicted and previously discussed with respect to FIG. 3b. After the first container, the second container is accumulated with the third container within a TLV sequence. More specifically, the third container includes a $Type_2$ field that includes an EOC indication. The EOC indication identifies the second container as the last container within the third container. Following the $Type_2$ field, the third container includes a $Length_2$ field that specifies the length of the second container. In the instant example, the length of the second container equals "5" based upon the assumed lengths of the respective fields. Following the $Length_2$ field the third container includes the second container as depicted and described above in connection with the lower portion of FIG. 3b. The EOC indication is placed within the Type field of the last container to be transmitter upon a determination that the overall container is to be scheduled for transmission. In the instant case, the packet containing the third container is transmitted from switch S1 20 to switch S5 21 over label switched path (LSP) C.

Upon receipt at network switching device S5 21, the label in the shim header $Header_3$, is inspected and a determination is made that the packet is to be forwarded intact from the network switching device S5 21 to network switching device S2 22 over LSP C using a shim header including a label L4 (FIG. 1). The forwarding engine in network switch S5 21 forwards the packet to the appropriate output port via a single forwarding operation based upon the incoming shim header, and the network switch S5 21 forwards the packet out of the appropriate output port over the respective output 21b. It is noted in the instant simplified example, a single forwarding operation is performed by the forwarding engine within the network switch S5 21. Had the packet not been forwarded within a container, as presently disclosed, four forwarding operations would have needed to be performed by the forwarding engine within network switch S5 21, i.e. one for each of packets A, B, C and D.

Upon receipt of the third container at network switching device S2 22 at one of the inputs 22a, the network switching device S2 22 inspects the shim header Header₃ and determines that the third container must be unpacked as the first and second containers are no longer intended to traverse the same LSP. Accordingly, the respective input port unpacks the first and second containers. Based upon a label contained within the first container header, the network switching device S2 22 forwards the first container to a first output port and based upon a label contained with the second container header, the network switching device S2 22 forwards the second container to a second output port. At the first output port of the network switching device S2 22, a new label L5 is inserted within the shim header and the packet containing the first container is forwarded over label switched path (LSP) D for receipt at an input 34a of edge switch ES3 34. At the second output port of the network switching device S2 22, a new label L6 is inserted within the shim header and the packet containing the second container is forwarded over label switched path (LSP) E for receipt at an input 36a of edge switch ES4 36.

The edge switches ES3 34 and ES4 36 inspect the labels within the respective incoming headers and determine that the respective first and second containers must be unpacked and the packets contained therein forwarded in their native format. Accordingly, the edge switch ES3 34 upon recognition of the label L5 in the header of the received packet, unpacks the first container and forwards packets A and B to the appropriate output port(s) of edge switch ES3 34. Similarly, edge switch ES4 36, upon recognition of the label L6 in the header of the received packet, unpacks the second container and forwards packets C and D to the appropriate output port(s) of edge switch ES4 36.

In the foregoing manner, the number of forwarding operations that need to be performed within the forwarding engines of network switching devices may be significantly reduced. While only four packets are described in connection with the illustrative example, the containers in typical networks may contains large numbers of packets resulting in substantial reductions in the number of forwarding operations that need to be performed.

Moreover, while only a single network switch S5 21 is depicted between network switch S1 20 and network switch s2 22, in practice, each label switched path may include a number of network switches and reductions in forwarding operations are achieved at each intermediate network switching device.

It should further be noted that decisions regarding which flows should be packed in containers and which flows should not be packed may be made as an administrative function. Additionally, containerization of packets may be performed on explicitly routed packets or on dynamically routed packets.

Figure 4:
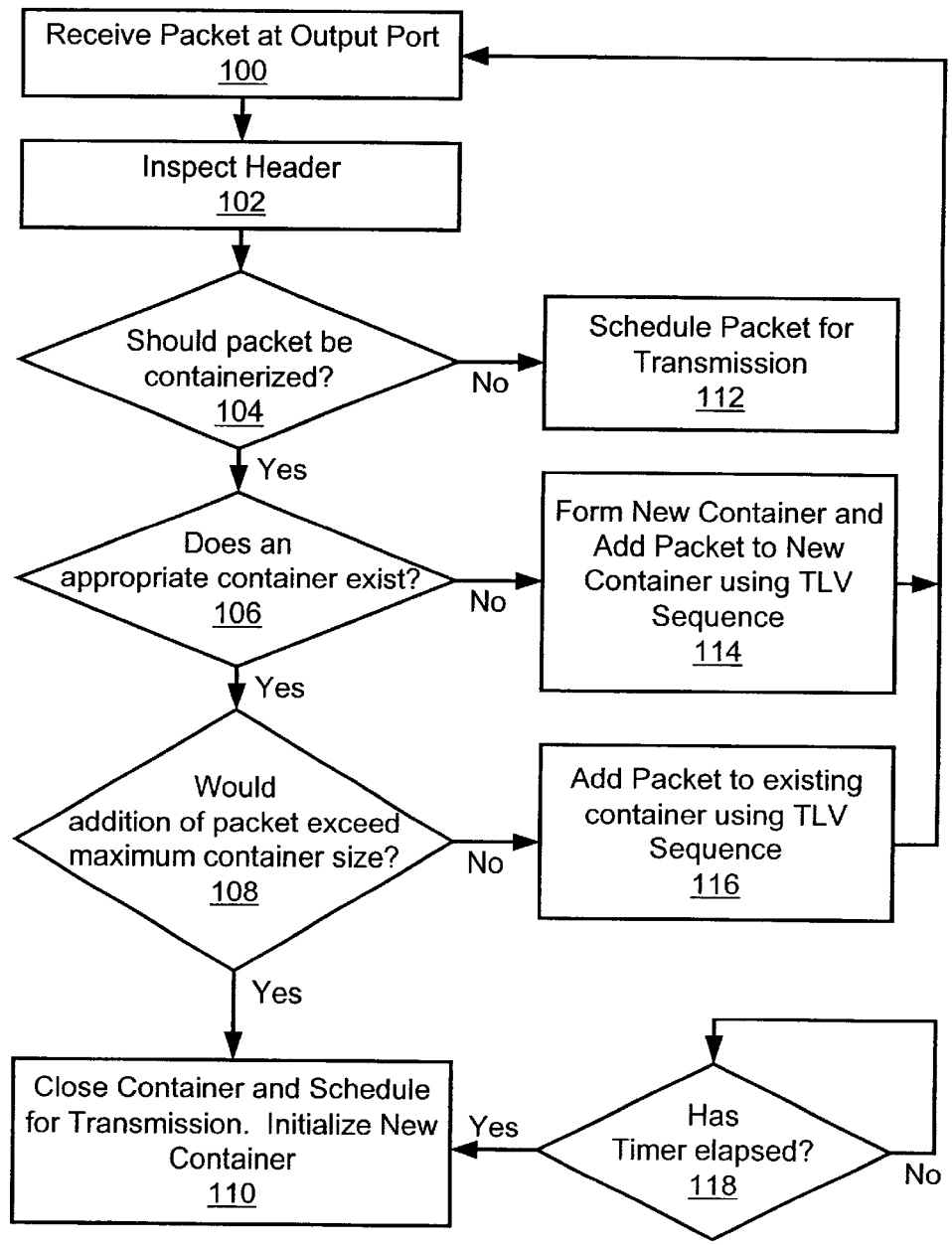
FIG. 4 s a flow diagram depicting a method for packing messages in accordance with the present invention.

A method for packing containers in accordance with the presently disclosed invention is illustrated in the flow diagram of FIG. 4. A packet is received at an input port at a network switching device capable of packet aggregation as depicted in step 100. The header is inspected as depicted in step 102. As illustrated in step 104 a determination is made based whether the packet should be stored within a container in advance of packet forwarding. This determination is made based upon an inspection of information within the header of the received packet, such as a label within a shim header of an MPLS packet. If the packet is to be forwarded within a container, a determination is made as to whether an appropriate container has been opened as depicted in step 106. If an appropriate container already exists, a determination is made whether the addition of the packet to the container would exceed a predetermined maximum container size for the respective container as illustrated in step 108. If the addition of the packet to the container would exceed the maximum container size for the container, the container is closed and scheduled for transmission without the addition of the received packet as shown in step 110. Closure of the packet for transmission will include setting the last Type field within the last packet or container, as applicable, to the EOC state to facilitate proper unpacking of the container. Also as depicted in step 110 a new container is initiated and the received packet is stored within the new container in the above described TLV sequence.

Should it be determined in step 104 that the packet is not to be containerized, the packet is forwarded out of the respective output port conventionally as illustrated in step 112. By way of explanation, the packet scheduled for transmission per step 112 could be either a single packet or a container that was received from an upstream network switching device.

Should it be determined in step 106 that an appropriate container does not exist, a new container is formed and the received packet is added to the new container in the TLV sequence format as shown in step 114. Control passes to step 100 to await receipt of the next packet at the respective output port.

Should it be determined in step 110 that the addition of the packet to an appropriate existing container would not exceed the maximum container size, the packet is added to the existing container as illustrated in step 116 and control passes to step 100 to await receipt of the next packet at the output port.

Finally, as a parallel process, a determination is made as to whether the timer associated with the respective container has expired as depicted in step 118. Upon expiration of the timer, the associated container is closed and scheduled for transmission.

Figure 5:
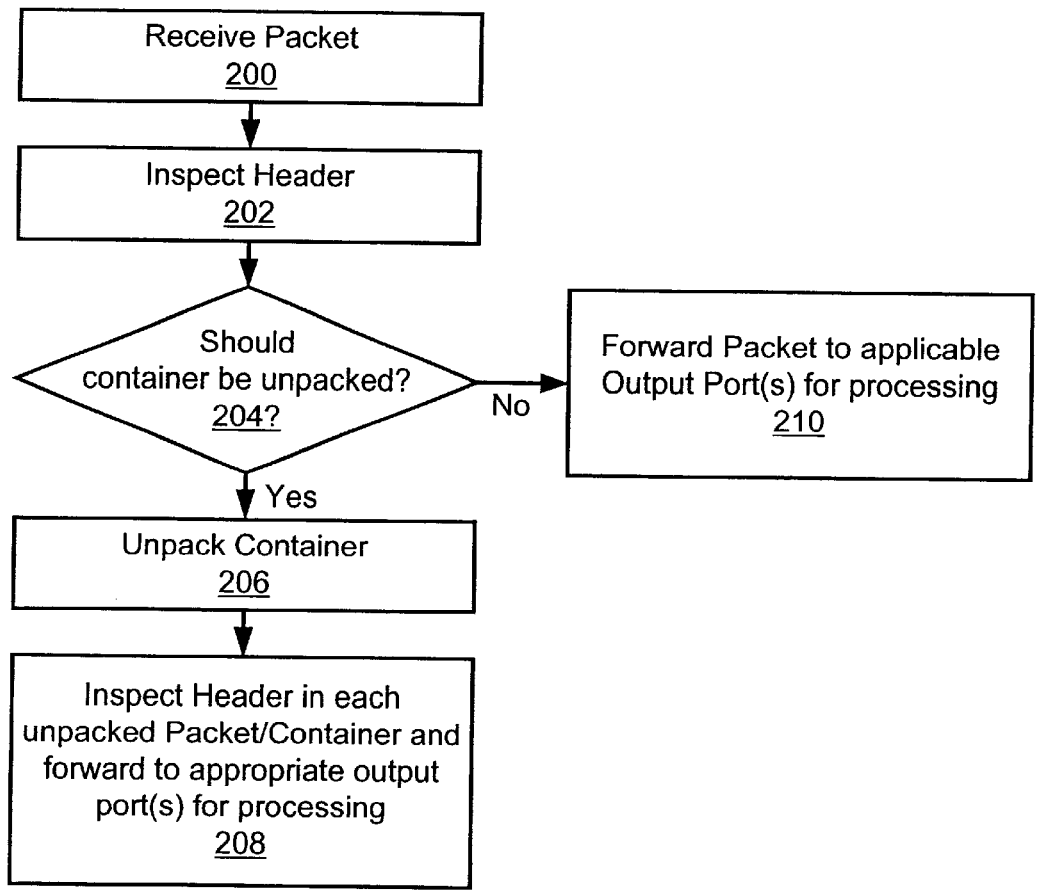
FIG. 5 is a flow diagram depicting a method for unpacking messages in accordance with the present invention.

FIG. 5 depicts a method in accordance with the presently disclosed technique for unpacking containers received at a network switching device. More specifically a packet is received at an input port of a network switching device as depicted in step 200. The header is inspected as depicted in step 202. Based upon information contained within the header, such as a label within an MPLS shim header, a determination is made whether the received packet includes a container that should be unpacked as depicted in step 204. If it is determined that the received packet includes one or more containers that should be unpacked, the successive containers are unpacked as depicted in step 206 until a Type field is recognized that identifies the last container in the sequence. The number of levels to be unpacked is determined from the information within the respective unpacked containers. For example, upon unpacking the third container depicted in FIG. 3c, the network switch obtains first and second containers. The labels within these headers are inspected to ascertain whether these containers should also be unpacked. The headers within the respective containers and/or packets that are obtained from the unpacking operation are inspected and the respective containers/packets are forwarded to the appropriate output port(s) for containerization as discussed with respect to FIG. 4 for transmission.

It will be appreciated by those of ordinary skill in the art that variations to and modifications of the above-described system and method may be made without departing from the inventive concepts disclosed herein. Accordingly, the invention should not be viewed as limited except by the scope and spirit of the appended claims.

What is claimed is:

1. A method for forwarding a plurality of data packets in a communications network comprising:

receiving at least first and second packets at a first network device within said communications network;

generating a first container that includes a first container header and said at least first and second packets contained in respective first and second value (V) fields, said first container including type (T) and length (L) fields associated with each one of said first and second value fields, said type field indicating whether the packet contained within the associated value fields is the last packet within the first container and said length field specifying the length of the associated value field, said first container header containing at least one first path identifier; and forwarding said first container from said first network device to a second network device within said communications network.

2. The method of claim 1 wherein said second network device includes a plurality of output ports and said method further includes the steps of selecting one of said plurality of output ports of said second network device based upon said first path identifier contained within said first container header and forwarding said first container to said selected output port via a single forwarding process executed by a forwarding engine within said second network device; and forwarding said first container from said selected one of said plurality of output ports of said second network device.

3. The method of claim 2 further including the steps of:

receiving said first container at a third network device within said communications network, said first container including a predetermined label within a header associated with said first container when said first container is received at said third network device;

comparing said predetermined label to a data file maintained at said third network device to determine whether said first container should be unpacked;

if, as a result of said comparing step, it is determined that said first container should be unpacked, parsing said first and second packets from said first container; and forwarding said first and second packets to selected output ports of said third network device based upon labels maintained within headers associated with said first and second packets.

4. The method of claim 3 wherein said first and second packets each include a header and a payload.

5. The method of claim 3 wherein said first and second packets each include a header and a container housing multiple packets.

6. The method of claim 1 wherein said first and second packets comprise second and third containers.

7. The method of claim 6 wherein said second and third containers each include respective second and third container headers and a plurality of packets stored within the value fields of respective TLV sequences formed of said Type, Length and Value fields.

8. The method of claim 6 wherein said second and third containers each include respective second and third container headers and a plurality of containers stored within the value fields of respective TLV sequences.

9. The method of claim 1 wherein said forwarding step includes the steps of adding received packets to said first container until the addition of the last received packet would exceed a predetermined maximum container size for said first container; and upon determining that the addition of the last received packet would exceed the predetermined maximum container size scheduling said first container for transmission from said first network device without the addition of said last received packet.

10. The method of claim 1 wherein said forwarding step includes the steps of:

maintaining a timer that generates a value associated with the period from the arrival of the first packet associated with the first container; and scheduling the first container for transmission in the event said timer reaches a predetermined timer threshold.

11. The method of claim 1 wherein said first path identifier comprises a label stored within a shim header.

12. The method of claim 11 further including the steps of transmitting said first container through at least two network devices operative in accordance with two different transport protocols and making a forwarding decision within the respective network devices based upon said first path identifier contained within said first container upon receipt at the respective network devices.

13. The method of claim 12 wherein said first path identifier comprises a label disposed within a shim header.

* * * * *